United States Patent
Fitzgerald et al.

(10) Patent No.: US 12,273,408 B1
(45) Date of Patent: *Apr. 8, 2025

(54) MIGRATING AN ON PREMISES WORKLOAD TO A WEB SERVICES PLATFORM

(71) Applicant: Amazon Technologies, Inc., Reno, NV (US)

(72) Inventors: Matthew John Fitzgerald, Seattle, WA (US); Kevin Edward Kelly, Ashburn, VA (US); Rudolph Vaughn Valdez, Sammamish, WA (US); Paul Horvath, San Juan Capistrano, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1705 days.

This patent is subject to a terminal disclaimer.

(21) Appl. No.: 16/404,930

(22) Filed: May 7, 2019

Related U.S. Application Data

(63) Continuation of application No. 14/500,888, filed on Sep. 29, 2014, now Pat. No. 10,326,826.

(51) Int. Cl.
| | |
|---|---|
| *H04L 67/10* | (2022.01) |
| *G06N 5/047* | (2023.01) |
| *G06N 99/00* | (2019.01) |

(52) U.S. Cl.
CPC .......... *H04L 67/10* (2013.01); *G06N 5/047* (2013.01); *G06N 99/00* (2013.01)

(58) Field of Classification Search
CPC ....................................................... H04L 67/10
See application file for complete search history.

(56) References Cited

U.S. PATENT DOCUMENTS

| | | | |
|---|---|---|---|
| 6,671,801 B1 | 12/2003 | Prakash | |
| 8,600,943 B1 * | 12/2013 | Fitzgerald | ............. G06F 16/119 |
| | | | 707/648 |
| 2010/0076933 A1 | 3/2010 | Hamilton et al. | |
| 2011/0179141 A1 | 7/2011 | Ravichandran et al. | |
| 2012/0096134 A1 * | 4/2012 | Suit | ..................... H04L 41/0893 |
| | | | 709/221 |
| 2012/0131173 A1 * | 5/2012 | Ferris | .................... G06F 9/5066 |
| | | | 709/224 |
| 2012/0284408 A1 | 11/2012 | Dutta et al. | |
| 2012/0317504 A1 * | 12/2012 | Patel | ...................... G06F 9/451 |
| | | | 715/762 |
| 2013/0346619 A1 | 12/2013 | Panuganty et al. | |
| 2014/0344395 A1 | 11/2014 | Alexander | |
| 2014/0359128 A1 | 12/2014 | Bhattacharya et al. | |

(Continued)

OTHER PUBLICATIONS

Migrating your Existing Applications to the AWS Cloud, by Varia, published 2010.

(Continued)

*Primary Examiner* — Hua Fan
(74) *Attorney, Agent, or Firm* — BakerHostetler

(57) ABSTRACT

Techniques are disclosed for migrating a computer application from an entity's premises to a web services platform. Data from multiple sources on the entity's premises is gathered and normalized into a common format. The normalized data is used to create a topology of the network on the entity's premises. This topology is analyzed to determine whether a computer application executing on the entity's premises may be migrated to the web service platform.

20 Claims, 8 Drawing Sheets

(56) References Cited

U.S. PATENT DOCUMENTS

2014/0359129 A1   12/2014   Sharma et al.
2015/0142858 A1    5/2015   Bryan et al.

OTHER PUBLICATIONS

Cloudward Bound: Planning for Benefitial Migration of Enterprise Applications to the Cloud, by Hajjat, published 2010.
Service Migration Patterns, by Fehling, published 2013.
M. Hajjat et al., "Cloudward Bound: Planning for Beneficial Migration of Enterprise Applications to the Cloud", Assoc. Comp. Mach. SIGCOMM'10, Aug. 30-Sep. 3, 2010, pp. 243-254.
B. Zong et al., "Cloud service placement via subgraph matching", Data Engineering (ICDE), 2014 IEEE 30th International Conference on, IEEE, 2014, pp. 832-843. (Year: 2014).
T. Binz et al., "Formalizing the Cloud through Enterprise Topology Graphs", Cloud Computing, IEEE Fifth Int'l Conf. on, pp. 742-749, 2012. (Year: 2012).

\* cited by examiner

MIGRATING AN ON PREMISES WORKLOAD TO A WEB SERVICES PLATFORM

CROSS REFERENCE TO RELATED APPLICATIONS

The present application is a continuation of U.S. patent application Ser. No. 14/500,888 entitled "MIGRATING AN ON PREMISES WORKLOAD TO A WEB SERVICES PLATFORM", filed Sep. 29, 2014, the contents of which are hereby incorporated by reference in entirety.

BACKGROUND

Some entities, such as businesses, host their computer applications in their own datacenters (sometimes referred to as hosting their computer applications "on premises"). An example of such a computer application is a three-tiered application that comprises one process that a user directly interfaces with, one process that processes the data, and a database management system. Others host their computer applications in a third party's web services platform, or split their computer applications between their own datacenters and a web services platform (either by entirely hosting some computer applications on premises, and others on a web services platform, or by splitting a particular computer application so that some parts of it are hosted on premises, and others are hosted on a web services platform).

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1:
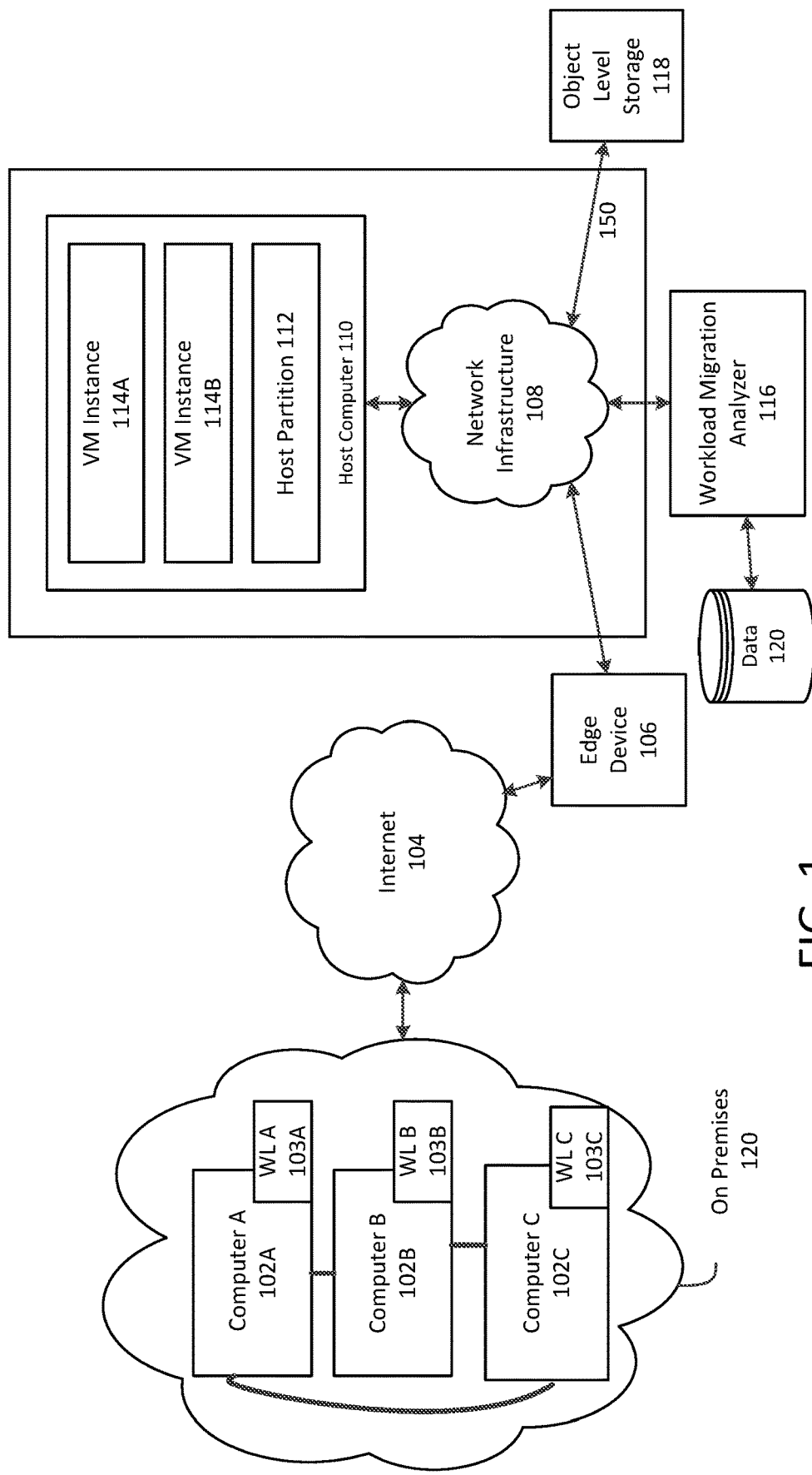
FIG. 1 depicts an example operating environment in which embodiments may be implemented.

Some entities would prefer the benefits provided by a web services platform to less robust environments available on premises. They may desire this for several reasons, such as reduced cost, or improved uptime. However, it may be difficult to identify which computer applications may be migrated to a web services platform and the associated level of effort required to migrate. As used herein, a computer application may generally refer to an application that has its execution divided among a plurality of computing nodes of a datacenter or web services platform, where these computing nodes may perform different functions (and also where multiple nodes may also perform redundant functions, such as where multiple nodes serve as a user interface). For example, this may include the above-discussed three-tier application. It may be difficult to identify whether a computer application may be migrated to a web services platform because there are certain performance requirements associated with executing the application, such as a maximum latency tolerance associated with processing a database query.

The present techniques may be used to determine which computer applications executing on premises may be migrated to a web services platform (either in whole or in part), and if so, take steps to migrate a computer application, such as by identifying the migratable computer application to an application administrator, or by generating all or part of a configuration file used by the web services platform to begin execution of the computer application.

In an example embodiment, the application administrator's on premises workload is monitored. This may comprise retrieving data about what processes execute on what computing nodes of the datacenter, how they are connected (e.g., whether one node accesses a database hosted on another node), and the computing nodes themselves (e.g., operating system version), and may include data used by processes that execute. These connections may be alternatively called dependencies, inasmuch as a process executing on one node may depend on another process executing on another node to properly function. In general, a workload may be a system that is running across an infrastructure within a data center. For instance, a workload may comprise an application that is running on multiple computing nodes to provide a user with a particular functionality. To that end, a workload may comprise a number and variety of processes that interact, that use various ports, that write to local storage, a network storage device, such as a SAN, and so on.

When this data about processes and computing nodes is retrieved, it may then be normalized into a common format so that it may be combined. The normalized data may be combined into a topology of the datacenter—a graph identifying nodes, processes that execute on those nodes, and dependencies between the nodes and processes. That is, the topology may comprise a graph of hardware and software characteristics and a relationship among those hardware and software characteristics. The topology may be analyzed to see if it matches any known patterns—to see if any subset of the topology is recognized as a known configuration for a computing application. Where a pattern is recognized, this may indicate a computing application that may be transferred to a web services platform, and corresponding action may be taken, such as by generating a configuration file, as discussed above. As used and described herein a web services platform may also refer to a cloud computing platform.

There exist techniques for virtualizing individual servers. However, these techniques may be distinguished from the present techniques. For example, virtualizing one particular server does not involve analyzing multiple servers, analyzing the dependencies between multiple servers, or creating a topology of at least part of a datacenter in which the server operates to determine whether the server may be virtualized.

Turning now to the figures, FIG. 1 depicts an example operating environment in which embodiments may be implemented for migrating workloads from on premises to a web services platform. As used herein, the term migrating may or may not entail migrating the application that services the workload itself. Rather, migrating as used herein may include finding a corresponding application on the web services platform that is capable of providing equivalent functionality as an application provided in the on premises environment so that the workload can be moved to the web service platform. Generally, the operating environment of FIG. 1 includes a multi-entity web services platform 150 that comprises multiple virtual machine instances executing on host computer 110 (the instances and host computers may both be described as being computing nodes, and there may be multiple instances of host computer 110), that may each host one or more parts of a computer application. Workload migration analyzer 116 may analyze a workload on premises 120 to determine whether the workload may be migrated to web services platform 150, such as by executing on one or more VM instances 114. In embodiments, workload migration analyzer may implement some or all of the operating procedures of FIGS. 2-5.

In embodiments, computer A 102A, computer B 102B, and computer C 102C may host one or more parts of a computing platform. For example, each of these computers may host a different tier of a three-tier application as described above. In the particular example illustrated in FIG. 1, Computer A 102A hosts workload (WL) A 103A, Computer B 102 B hosts WL B 102 B, and Computer C 102 C hosts WL C 103C. The various workloads hosted by Computers 102A, 102B, 102C may cooperate together, e.g., over the various network connections shown and be dependent on each other to provide a computer application that the application administrator desires to migrate to web services platform 150.

Computer A 102A, computer B 102B, and computer C 102C are generally computers disposed in an entity's facility, which are configured to access the web services platform 150 via a public network, e.g., Internet 104. In turn, the connection point between the multi-entity web services platform 150 and Internet 104 is edge device 106. In embodiments, edge device 106 may be a gateway router. Within the multi-entity web services platform, edge device 106 connects to another computer network—network infrastructure 108. Network infrastructure 108 may be an intranet that is separate from Internet 104. Also connected to network infrastructure 108 are database 116, object-level storage 118, workload migration analyzer 116, and host computer 110.

As depicted, web services platform 150 comprises host computer 110, which is configured to execute one or more virtual machine instances 114 (depicted here as VM instance 114A and VM instance 114B) and a host partition 112. While host computer 110 is depicted here as executing two VM instances 114, it may be appreciated that host computer 110 may execute more or fewer VM instances.

In embodiments, an application administrator directs the multi-entity web services platform to execute one or more VM instances on the entity's behalf. These VM instances may then execute to perform functions for the entity, such as a function of a web server for the entity's web site or a web application that involves passwords, or to perform compute functions, such as encoding video. These functions may be computer applications that an entity might otherwise host on premises 120.

In addition to this aspect of the web services platform, entities may also store data in object-level storage 118. Object-level storage 118 is depicted as storing data as objects (e.g., an entity instructs the web services platform to store or retrieve a specific file). It may be appreciated that there are embodiments where a block-level storage service is implemented instead of, or in addition to, object-level storage 118. Object-level storage 118 may also be used by other devices on the web services platform to store data. For example, as described in more detail herein below, workload migration analyzer 116 may store data about entity workloads hosted on premises for analyzing whether a workload may be migrated to web services platform 150.

Figure 2:
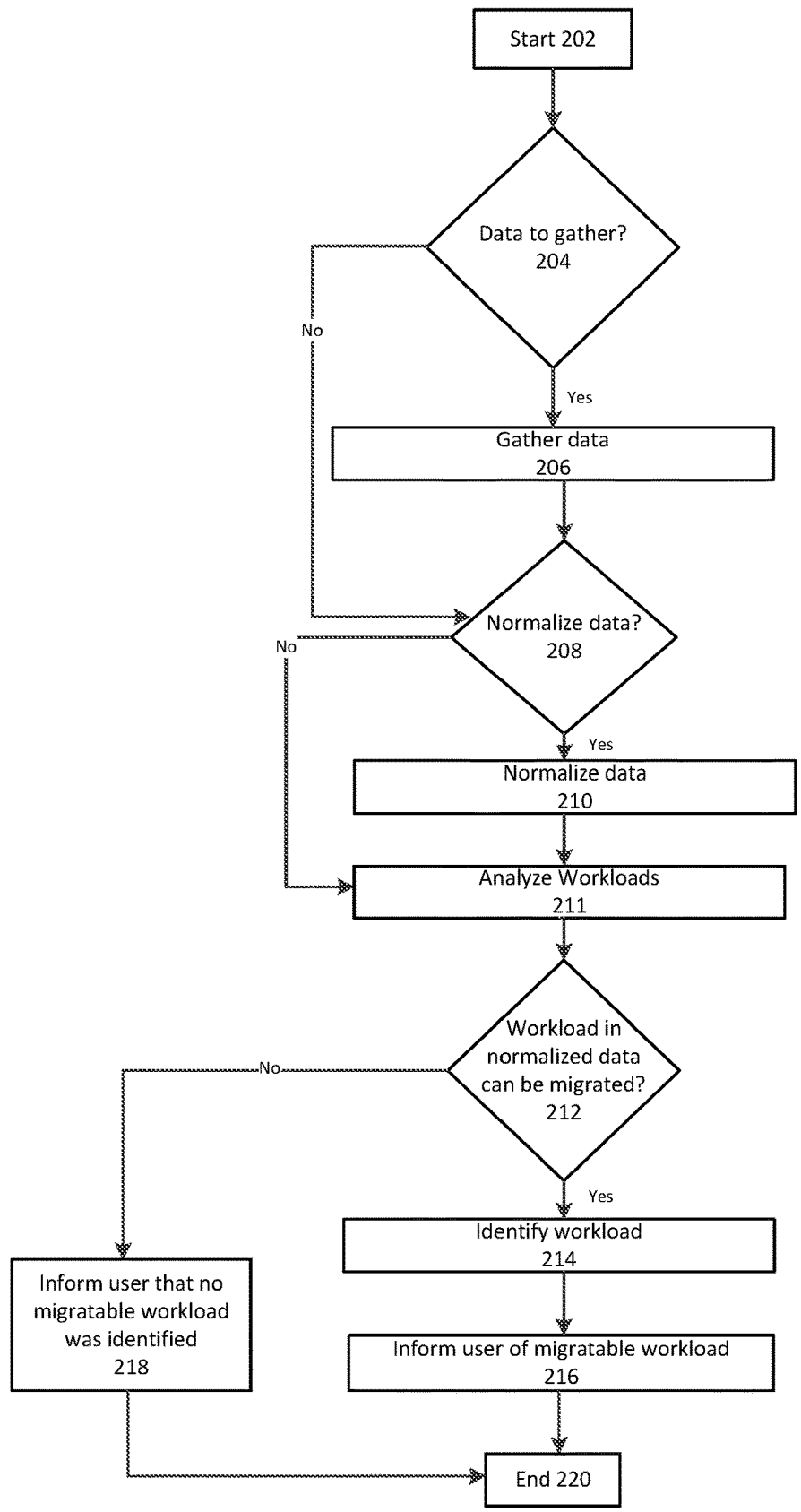
FIG. 2 depicts example operating procedures for identifying an on premises workload that may be migrated to a web services platform.

FIG. 2 depicts example operating procedures for identifying an on premises workload that may be migrated to a web services platform. In embodiments, the operating procedures of FIG. 2 may be implemented by workload migration analyzer 116 of FIG. 1. In other embodiments, some or all of the operations of FIG. 2 (and FIGS. 3-5) may be performed on premises 120. For example, for security considerations, operations involving gathering data from on premises devices, generating a topology from that data, and identifying a subset in the topology may be performed on premises 120 so that information does not leave on premises 120.

It may be appreciated that there may be embodiments that implement more or fewer operations than are depicted in FIG. 2 (and FIGS. 3-5), or implement the operations depicted in FIG. 2 (and FIGS. 3-5) in a different order than is depicted. For example, there may be embodiments that implement fewer operations than are depicted in FIG. 2 where operation 218 is not implemented. The operating procedures of FIG. 2 start at operation 202 and move to operation 204.

Operation 204 depicts determining whether there is data to gather. This data may be data about the nodes and processes of on premises 120 that is used to determine whether there is a computer application that may be migrated to web services platform 150.

In embodiments, the operating procedures of FIG. 2 may be performed on web services platform 150 and the data may be gathered from on premises 120. It may be that web services platform 150 actively gathers the data from on premises 120, or that on premises 120 gathers the data itself from computing nodes and processes and provides the gathered data to web services platform 150 (which may be considered to be a form of gathering). Where on premises 120 has not directly provided the data to web services platform 150, it may be determined that there is data to gather. And where on premises 120 has directly provided the data to web services platform 150, or where web services platform 150 otherwise has the data, it may be determined that there is not data to gather. Where in operation 204 it is determined that there is data to gather, then the operating procedures of FIG. 2 move to operation 206. Instead, where in operation 204 it is determined that there is not data to gather, then the operating procedures of FIG. 2 move to operation 208.

Operation 206 is reached from operation 204 where it is determined that there is data to gather. Operation 206 depicts gathering data. In embodiments, operation 206 may be implemented in a similar manner as the operating procedures of FIG. 3, for one or more computing nodes or processes or on premises 120. In embodiments, operation 206 may comprise identifying a first workload of a first computer in a datacenter, and a second workload of a second computer in the datacenter. In embodiments, operation 206 may comprise receiving information about the datacenter and its devices provided by an administrator of the datacenter. After operation 206, the operating procedures of FIG. 2 move to operation 208.

Operation 208 is reached from operation 206, or from operation 204 where it is determined that there is not data to gather. Operation 208 depicts determining whether there is data to normalize. Data retrieved from various nodes and processes may be in different formats and may be converted into a common format before a topology is generated from it. For example, different companies may offer products that generate data in different formats.

In embodiments, operation 208 may comprise analyzing each part of the data (separate parts may be obtained from separate nodes or processes) to determine if it is already in normalized form—by having a known structure that corresponds to what is considered normalized form by web services platform 150—or if it is in some other form. Where the data is already normalized, it may not need to be further normalized. And where the data is not already normalized, it may need to be normalized. Where in operation 208 it is determined that there is data to normalize, then the operating procedures of FIG. 2 move to operation 210. Instead, where in operation 208 it is determined that there is not data to normalize, then the operating procedures of FIG. 2 move to operation 210.

Operation 210 is reached from operation 208 where it is determined that there is data to normalize. Operation 210 depicts normalizing the data. In embodiments, operation 210 may be implemented in a similar manner as the operating procedures of FIG. 4. In embodiments, operation 210 may comprise converting at least one of the identification of a first workload and a second workload into a common format or transforming data indicative of the datacenter from a first format to a second format. In embodiments, operation 210 may also comprise transforming data indicative of the datacenter from a first format to a second format, the second format comprising an Extensible Markup Language (XML) format, and transforming comprising performing an Extensible Stylesheet Language Transformation (XSLT). An example XML format that may be used is RDF/XML (Resource Description Framework) that may be used to express graph data (such as a topology) in XML format. Where an RDF format is used, a SPARQL query language may be used to retrieve and store the data in RDF format to generate a topology. After operation 210, the operating procedures of FIG. 2 move to operation 211.

After the data is normalized, the workload is analyzed in operation 211. Operation 211 is reached from operation 210, or from operation 208 where it is determined that there is not data to normalize. Operation 211 depicts analyzing the workload in the normalized data. While operation 211 may be reached from operation 208 and thus skip data normalization in operation 210, it may be appreciated that, in this case, the data is not normalized in operation 210 because it is already in a common format and can be considered normalized to begin with.

In embodiments, operation 211 may comprise generating a topology of at least part of the datacenter based at least in part on the identification of the first workload and the second workload; and identifying a subset of the topology that corresponds to a computer application that may be executed on a web services platform. In embodiments, this may comprise generating a topology of at least part of a datacenter; and identifying a subset of the topology that corresponds to a computer application of the datacenter that may be executed on a web services platform.

A topology may comprise an indication of at least a first computing node and a second computing node of the datacenter, and an indication of a relationship between the first computing node and the second computing node. In embodiments, various information about the datacenter may be used to generate the topology. For example, the topology may be generated based at least in part on factors such as a latency associated with executing a first application or process or a second application in the datacenter; a dependency between a first computing node and a second computing node in the datacenter; an operating system version of the first computing node; a graphics card of the first computing node; a Basic Input/Output System (BIOS) version of the first computing node; a processor, memory, or disk utilization of the first computing node; or an input/output (I/O) utilization of the first computing node.

In other embodiments, operation 211 may comprise identifying the subset of the topology that corresponds to the computer application of the datacenter that may be executed on the web services platform based at least in part on traversing at least one dependency between computing nodes of the datacenter represented in the topology.

In other embodiments, operation 211 may comprise identifying the subset of the topology that corresponds to a computer application of the datacenter that may be executed on the web services platform based on a performance metric associated with the computer application being executed on the web services platform.

In other embodiments, operation 211 may comprise identifying the subset of the topology that corresponds to a computer application of the datacenter that may be executed on the web services platform based on an expected latency associated with the computer application being executed on the web services platform.

In other embodiments, operation 211 may comprise identifying a predetermined pattern in the topology, the predetermined pattern corresponding to a computer application of the datacenter that may be executed on a web services platform. Identifying a predetermined pattern may comprise identifying at least a subset of the topology that corresponds to the computer application. For instance, a subset of the topology may that a computing node is running a version of a Linux operating system, with an Apache web server, a MySQL database, and a PHP-coded front end for an application. This may indicate a predetermined pattern of a computing node that hosts a web application that utilizes a database backend.

Identifying a subset of the topology that corresponds to the computer application may comprise traversing dependencies in the topology—e.g., relationships expressed in the topology that indicate that one computing node accesses a resource on another computing node. Then, information about each computing node that is traversed may be determined from the topology. For example, it may be determined that an Oracle database is running on a computing node because it is communicating via certain network ports that are associated with Oracle databases. And the size of the computing node (in terms of processing capabilities) may be determined and associated with that Oracle database.

In embodiments, operation 211 may comprise determining a set of computing resources on which to execute the computer application, where that set of resources differs from that of the datacenter. For example, it may be that the datacenter uses physical load balancers, whereas on the web services platform, many load balancers are implemented in VM instances (such as VM instance 114A). Where this is the case, operation 211 may comprise determining a different set of computing resources of the web services platform that will still allow the computer application to execute.

With regard to identifying subsets or patterns of a topology, the following examples may be used. For finding a web server instance, the following characteristics may be identified:

For a UNIX operating system, determine if an HTTP daemon process running; If so, determine its command line For a WINDOWS operating system, determine if apache.exe running; If so, determine its path Determine the port that the web server is listening on Determine the memory of the computing node Determine how many CPUs the computing node has Determine if the computing node is physical or virtual Determine whether the computing node has a valid IP on a valid subnet For finding a mail server instance, the following characteristics may be identified:

Determine whether the computing node is running a mail server

If so, determine the version of the mail server Determine whether there a domain controller associated with the mail server Determine whether the computing node has a valid IP on a valid subnet For finding a computing node type on a web services platform that corresponds to a computing node type on premises, the following characteristics may be identified:

Determine how much memory the computing node has

Determine the number of CPUs the computing node has

Determine whether the computing node is physical or virtual

Determine whether the computing node has a valid IP on a valid subnet

For finding a MySQL database instance that runs on a known network port (e.g., port 3306) of a known operating system (e.g., a WINDOWS operating system), the following characteristics may be identified:

Determine the version of the MySQL database instance that is running

Determine how much memory the computing node has

Determine the maximum storage allocated to the computing node across all subsystems Determine how many CPUs the computing node has Determine whether the computing node is physical or virtual Determine whether the computing node has a valid IP on a valid subnet For finding an Oracle database instance, the following characteristics may be identified:

Determine the version of the Oracle database instance that is running

Determine the IP address and network port that the Oracle database instance is listening on Determine how much memory the associated computing node has Determine the maximum storage allocated to the host across all file systems that have 'ora' in the mount path Determine the number of CPUs the computing node has Determine whether the computing node is physical or virtual Determine whether the computing node has a valid IP on a valid subnet For finding client-server connections that might identify potential relational database service (RDS) PostgreSQL workloads, the following characteristics may be identified:

Determine how much memory the associated computing node has

Determine how many CPUs the computing node has

Determine whether the computing node is physical or virtual

Determine whether the computing node has a valid IP on a valid subnet

For finding an application server instance, the following characteristics may be identified:

Determine whether WebSphere or WebLogic or JBoss or Windows Server or another recognized application server is running; If so determine the version number Determine the IP address and network port that the application server instance is listening on Determine how much memory the computing node has Determine the maximum storage allocated to the computing node across all subsystems Determine the number of CPUs the computing node has Determine whether the computing node is physical or virtual Determine whether the computing node has a valid IP on a valid subnet For finding a 3-tier web application, the following characteristics may be identified:

Find a web server instance as described above.

Find an application server instance as described above

Look for a database instance; For example, look for a MySQL database as described above, an Oracle database instance as described above, or an (RDS) PostgreSQL workloads as described above.

For finding a media processing application, the following characteristics may be identified:

Find a web server instance as described above.

Determine whether the web server is accepting FTP or resumable HTTP requests with or without multi-part upload.

Determine if the web server is interacting with a queue

If the queue is running on another server or interacting with other servers, find a computing node type on a web services platform that corresponds to a computing node type on premises as described above.

Determine whether the web server is interacting with a SAN.

For finding a media distribution application, the following characteristics may be identified:

Find a web server instance as described above.

Determine if the web server is using Real Time Streaming Protocol (RTSP), HTTP, FTP, Real Time Messaging Protocol (RTMP) or other recognized protocols.

Determine if the web server is using CDN links to point to content; If so, determine the URL Determine if the web server interacting with a SAN Where in operation 212 it is determined that there is a workload in the normalized data that can be migrated, then the operating procedures of FIG. 2 move to operation 214.

When the analysis of the workload is complete, a determination is made whether or not there is a workload that can be migrated. Where in operation 212 it is determined that there is not a workload in the normalized data that can be migrated, then the operating procedures of FIG. 2 move to operation 218. Moreover, operation 214 is reached from operation 212 where it is determined that there is a workload in the normalized data that can be migrated. Operation 214 depicts identifying the workload that can be migrated. In embodiments, this may comprise saving an indication in memory that a particular pattern was found in the topology. After operation 214, the operating procedures of FIG. 2 move to operation 216.

Operation 216 depicts informing a user of the migratable workload. The user may be an application administrator associated with the datacenter, or an administrator of a web services platform. This indication may include documentation about best practices for migrating the particular computer application or migrating computer applications in general. In embodiments, this may comprise storing an indication of the computer application in a memory. In other embodiments, this may comprise generating a configuration file used to migrate the computer application, such as by generating at least part of a configuration document utilized by the web services platform to configure the computer application to execute on the web services platform, based at least in part on identifying the predetermined pattern in the topology.

In embodiments, it may not be that a particular workload or computer application may definitely be migrated to the web services platform. For example, there may be rarely-used features of a database on premises that are not found in the web services platform's database. So, where those features are not used, the computer application may be migrated, and where those features are used, it may be that the computer application may not be migrated. In such cases, informing the user of the migratable workload may comprise informing the user that it may be possible to migrate the workload, and that more investigation should occur.

Or it may be that the computer application cannot definitely be migrated because it is not certain what the computer application is. For example, the computer application may appear to likely be a web application, but it communicates via nonstandard network ports, or may be executed on a customized computing node such that it is not immediately clear whether a computing node of the web services platform is a suitable substitute. In such cases, an indication of what is known—e.g., that there may be a particular computing application that may be migrated—may be communicated to the user. After operation 216, the operating procedures of FIG. 2 move to operation 220, where the operating procedures of FIG. 2 end.

Operation 218 is reached from operation 212 where it is determined that there is not a workload in the normalized data that can be migrated. Operation 218 depicts informing the user that no migratable workload was identified. This may comprise emailing an administrator of web services platform 150 or on premises 120 an indication of this, or by presenting it to the user in a web interface displayed in a web browser. After operation 218, the operating procedures of FIG. 2 move to operation 220, where the operating procedures of FIG. 2 end.

Figure 3:
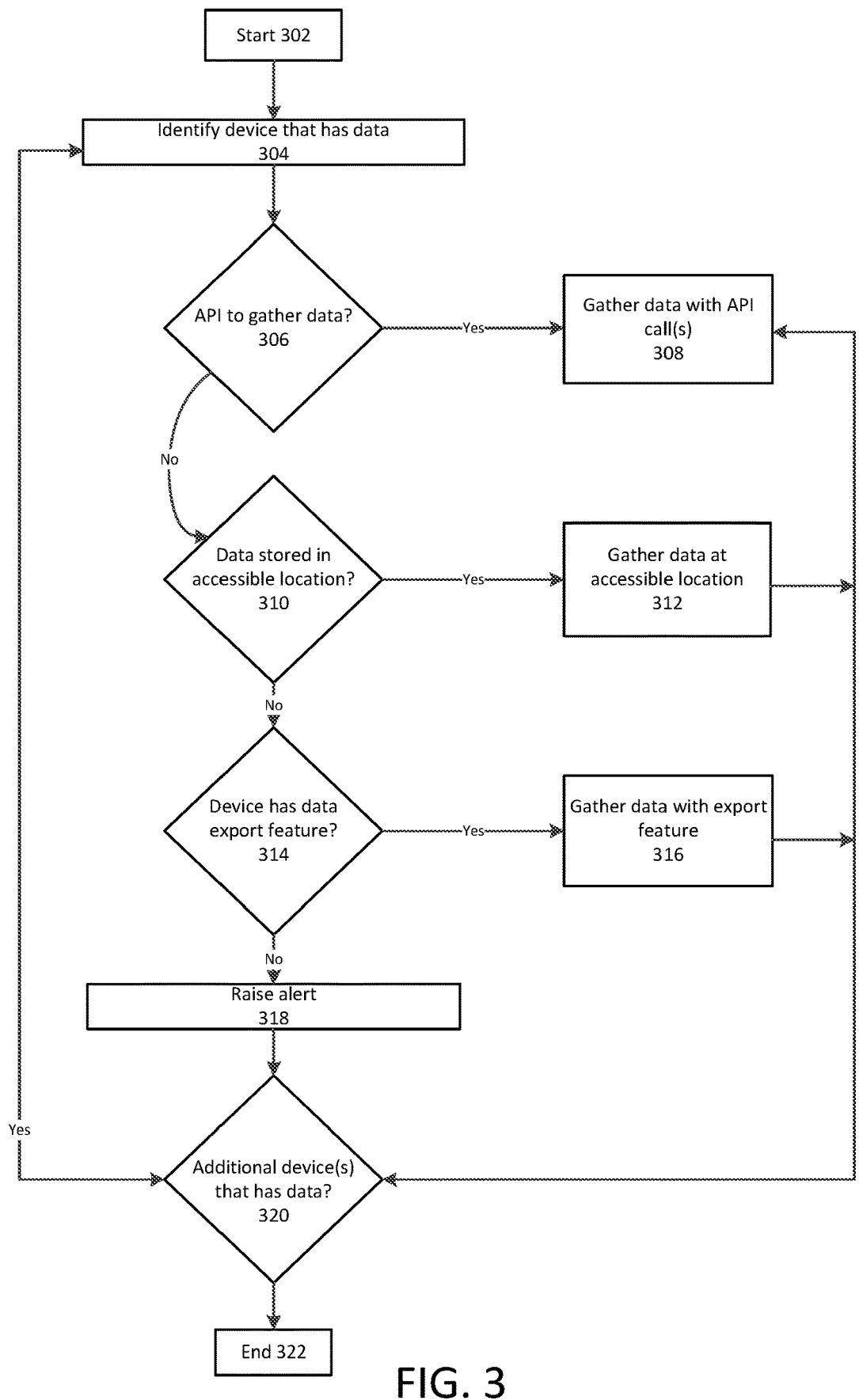
FIG. 3 depicts example operating procedures for gathering data about a workload from one or more devices.

FIG. 3 depicts example operating procedures for gathering data about a workload from one or more devices. In embodiments, the operating procedures of FIG. 3 may be implemented by workload migration analyzer 116 of FIG. 1. The operating procedures of FIG. 3 begin with operation 302 and move to operation 304.

Operation 304 is reached from operation 302, or from operation 320 where it is determined that there are additional device(s) that have data. Operation 304 depicts identifying a device that has data. This may comprise, for example, enumerating the devices on premises and determining whether the device is known to have data based on a precompiled list of devices. In other embodiments, a list of devices that have data to gather may be provided to web services platform for this purpose. After operation 304, the operating procedures of FIG. 3 move to operation 306.

Operation 306 depicts determining whether there is an API with which to gather data. This may comprise comparing the device type (e.g., device manufacturer, device model, device version) against a list of known devices that identifies whether a particular device has an API with which to gather data. Where in operation 306 it is determined that there is an API with which to gather data, the operating procedures of FIG. 3 move to operation 308. Instead, where in operation 308 is determined that there is not an API with which to gather data, the operating procedures of FIG. 3 move to operation 310.

Operation 308 is reached from operation 306 where it is determined that there is an API with which to gather data. Operation 308 depicts gathering data with API call(s). In embodiments, this may comprise gathering first data for a first computing node of the datacenter via an Application Programming Interface (API) call to the first computing node or a second computing node that has access to the first data. After operation 308, the operating procedures of FIG. 3 move to operation 320.

Operation 310 is reached from operation 306 where it is determined that there is not an API with which to gather data. Operation 310 depicts determining whether the data is stored in an accessible location. This may comprise comparing the device type (e.g., device manufacturer, device model, device version) against a list of known devices that identifies whether a particular device has data stored in a known location that is accessible to web services platform 150. Where in operation 310 it is determined that the data is stored in an accessible location, the operating procedures of FIG. 3 move to operation 312. Instead, where in operation 310 it is determined that the data is not stored in an accessible location, the operating procedures of FIG. 3 move to operation 314.

Operation 312 is reached from operation 310 where it is determined that the data is stored in an accessible location. Operation 312 depicts gathering data at the accessible location. In embodiments, this may comprise gathering first data for a first computing node of the datacenter by accessing the first data at a known computer storage location. After operation 312, the operating procedures of FIG. 3 move to operation 320.

Operation 314 is reached from operation 310 where it is determined that the data is not stored in an accessible location. Operation 314 depicts determining whether the device has an export feature for the data. This may be an export feature that may be accessed through a user interface. This may comprise comparing the device type (e.g., device manufacturer, device model, device version) against a list of known devices that identifies whether a particular device has an export feature. Where in operation 314 it is determined that the device has an export feature for the data, the operating procedures of FIG. 3 move to operation 316. Instead, where in operation 314 it is determined that the device lacks an export feature for the data, the operating procedures of FIG. 3 move to operation 318.

Operation 316 is reached from operation 314 where it is determined that the device has an export feature for the data. Operation 316 depicts gathering data with the export feature. This may comprise causing a computer application or a second computer application of the datacenter that has access to the data to export the first data via a user interface. After operation 316, the operating procedures of FIG. 3 move to operation 320.

Operation 318 is reached from operation 318 where it is determined that the device lacks an export feature. Operation 318 depicts raising an alert. This may comprise storing an indication in a log file (such as one maintained in object-level storage 118) that data could not be gathered for a particular device or presenting this alert in a web interface of a web browser. After operation 318, the operating procedures of FIG. 3 move to operation 320.

Operation 320 is reached from operation 308, 312, 316, or 318. Operation 320 depicts determining whether there are additional device(s) that have data. Where the devices of the datacenter have been enumerated, this may comprise determining whether there is a device in the enumeration for which an attempt to gather data has not yet been made. Where in operation 320 it is determined that there are additional device(s) that have data, the operating procedures of FIG. 3 return to operation 304. Instead, where in operation 320 it is determined that there are not additional device(s) that have data, the operating procedures of FIG. 3 move to operation 322 where the operating procedures of FIG. 3 end.

Figure 4:
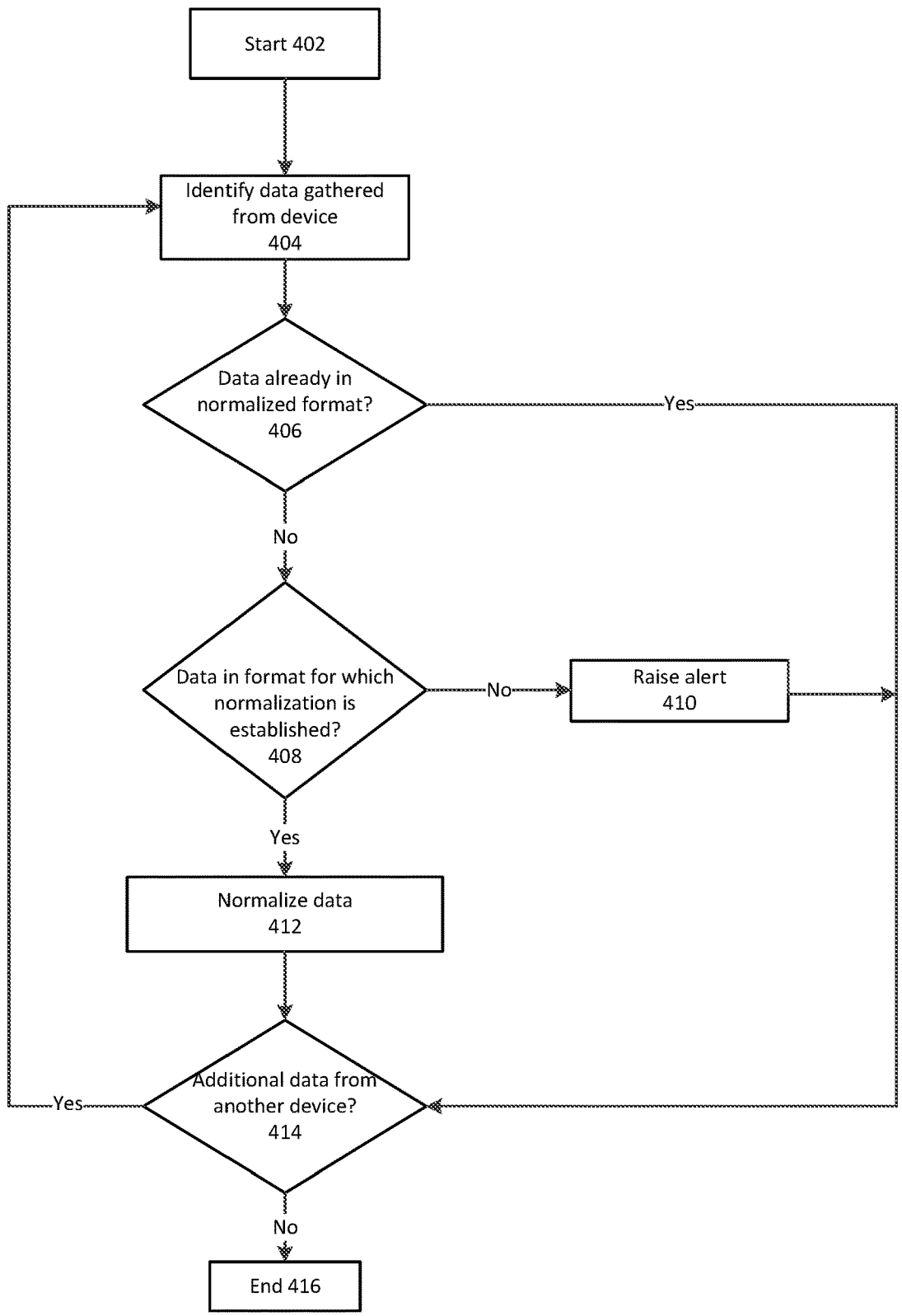
FIG. 4 depicts example operating procedures for normalizing data.

FIG. 4 depicts example operating procedures for normalizing data. In embodiments, the operating procedures of FIG. 4 may be implemented by workload migration analyzer 116 of FIG. 1. The operating procedures of FIG. 4 begin with operation 402 and move to operation 404.

Operation 404 is reached from operation 402, or from operation 414 where it is determined that there is additional data from another device. Operation 404 depicts identifying data gathered from a device. Where data for devices is stored in object-level storage 118, this may comprise selecting data for one device among the plurality of device data being stored. After operation 404, the operating procedures of FIG. 4 move to operation 406.

Operation 406 depicts determining whether the data is already in a normalized format. This may comprise analyzing the data to determine whether it has a known structure that corresponds to the data being normalized—e.g., if the data is in a XML or JSON (JavaScript Object Notation) format with a known schema. Where in operation 406 it is determined that the data is already in a normalized format, then the operating procedures of FIG. 4 move to operation 414. Instead, where in operation 406 it is determined that the data is not already in a normalized format, then the operating procedures of FIG. 4 move to operation 408.

Operation 408 is reached from operation 406 where it is determined that the data is not already in a normalized format. Operation 408 depicts determining whether the data is in a format for which normalization is established. Where the data is not already in a normalized format, it may be that there is a known way to transform the data from its current format to the normalized format, or that there is not a known way to transform the data from its current format to the normalized format. Where in operation 408 it is determined that the data is not already in a format for which normalization is established, then the operating procedures of FIG. 4 move to operation 410. Instead, where in operation 408 it is determined that the data is already in a format for which normalization is established, then the operating procedures of FIG. 4 move to operation 412.

Operation 410 is reached from operation 408 where it is determined that the data is not in a format for which normalization is established. Operation 410 depicts raising an alert. This alert may indicate that the data cannot be normalized and may be implemented in a similar manner as operation 318 of FIG. 3. After operation 410, the operating procedures of FIG. 4 move to operation 414.

Operation 412 is reached from operation 408 where it is determined that the data is in a format for which normalization is established. Operation 412 depicts normalizing the data. For example, this may comprise performing a XLST on the data to convert it to XML format with a known schema that corresponds to normalized data. After operation 412, the operating procedures of FIG. 4 move to operation 414.

Operation 414 is reached from operations 406, 410, or 412. Operation 414 depicts determining whether there is additional data from another device. For instance, where the gathered data for devices is stored in object-level storage 118, this may comprise determining whether there is data in object-level storage for which the operating procedures of FIG. 4 have not yet been performed in this analysis. Where in operation 414 it is determined that there is additional data from another device, then the operating procedures of FIG. 4 return to operation 404. Instead, where in operation 414 it is determined that there is not additional data from another device, then the operating procedures of FIG. 4 move to operation 416 where the operating procedures of FIG. 4 end.

Figure 5:
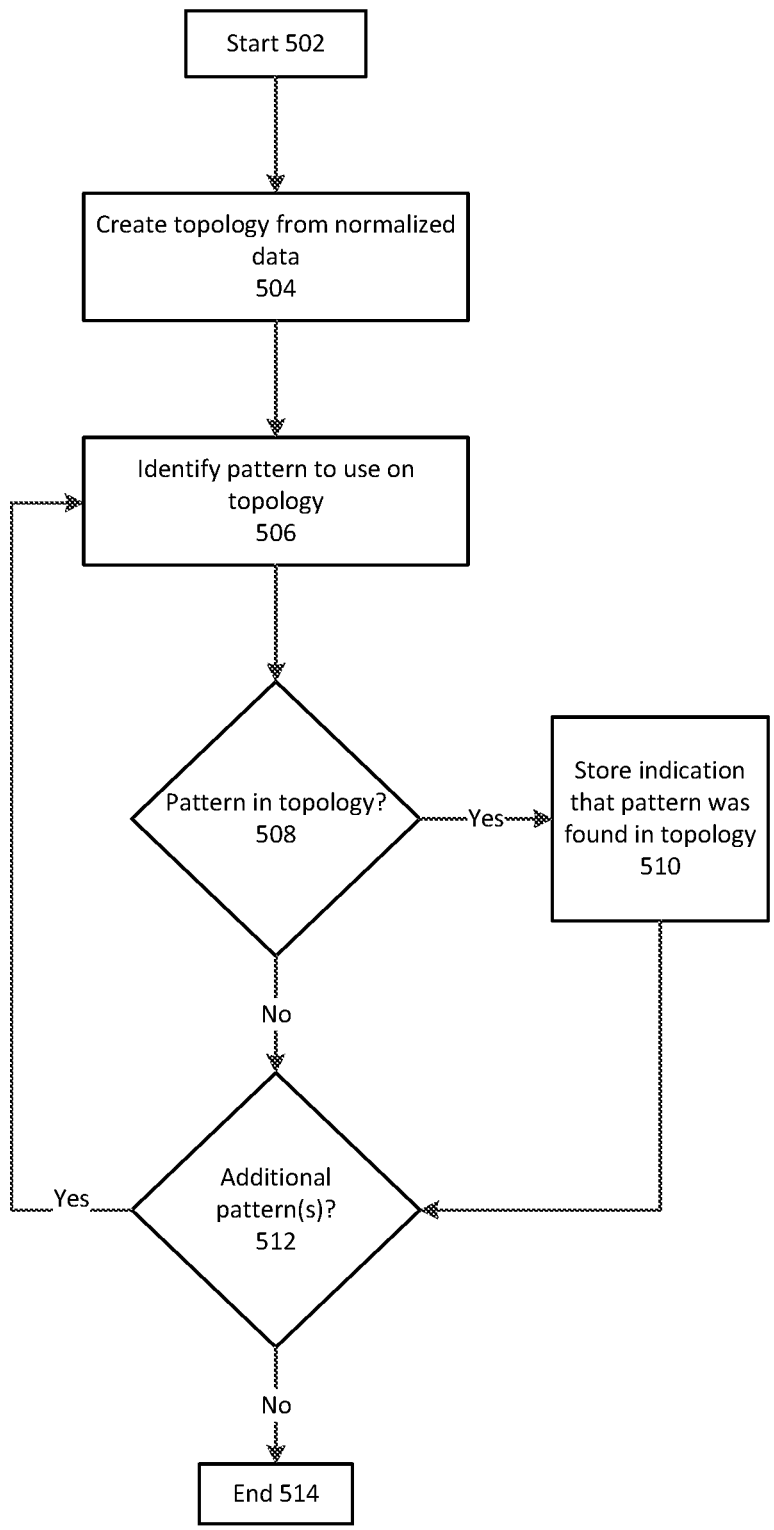
FIG. 5 depicts example operating procedures for identifying a workload that may be migrated to a web services platform in normalized data.

FIG. 5 depicts example operating procedures for identifying a workload that may be migrated to a web services platform in normalized data. In embodiments, the operating procedures of FIG. 5 may be implemented by workload migration analyzer 116 of FIG. 1. The operating procedures of FIG. 5 begin with operation 502 and move to operation 504.

Operation 504 depicts creating a topology from normalized data. In embodiments, operation 504 may be implemented in a similar manner as operation 212 as applied to creating a topology. After operation 504, the operating procedures of FIG. 5 move to operation 506.

Operation 506 is reached from operation 504, or from operation 512 where it is determined that there are additional pattern(s) with which to analyze the topology. Operation 506 depicts identifying a pattern to use on the topology. There may be a plurality of patterns—known subsets of topologies—that correspond to known computing applications. A plurality of topologies may be stored in object-level storage 118, and each time the operating procedures of FIG. 5 are implemented, the topology may be checked against each pattern. Here, a pattern to use on the topology may be identified from the plurality of patterns where the identified pattern has not yet been used on the topology during this implementation of the operating procedures of FIG. 5. After operation 506, the operating procedures of FIG. 5 move to operation 508.

Operation 508 depicts determining whether the pattern is found in the topology. In embodiments, operation 508 may be implemented in a similar manner as operation 212 of FIG. 2 as it applies to determining whether a pattern is found in a topology. Where in operation 508 it is determined that the pattern is found in the topology, the operating procedures of FIG. 5 move to operation 510. Instead, where in operation 508 it is determined that the pattern is not found in the topology, the operating procedures of FIG. 5 move to operation 512.

Operation 510 is reached from operation 508 where it is determined that the pattern is found in the topology. Operation 510 depicts storing an indication that the pattern was found in the topology. This may comprise storing an indication of this in a known location in object-level storage 118. After operation 510, the operating procedures of FIG. 5 move to operation 512.

Operation 512 is reached from operation 510, or from operation 508 where it is determined that the pattern is not found in the topology. Operation 512 depicts determining whether there are additional pattern(s) with which to analyze the topology. Where a plurality of patterns are maintained in object-level storage 118, this may comprise determining whether any of the plurality of patterns has not been compared against the topology during this implementation of the operating procedures of FIG. 5. Where in operation 512 it is determined that there are additional pattern(s) with which to analyze the topology, the operating procedures of FIG. 5 return to operation 504. Instead, where in operation 512 it is determined that there are not additional pattern(s) with which to analyze the topology, the operating procedures of FIG. 5 move to operation 514 where the operating procedures of FIG. 5 end.

Figure 6:
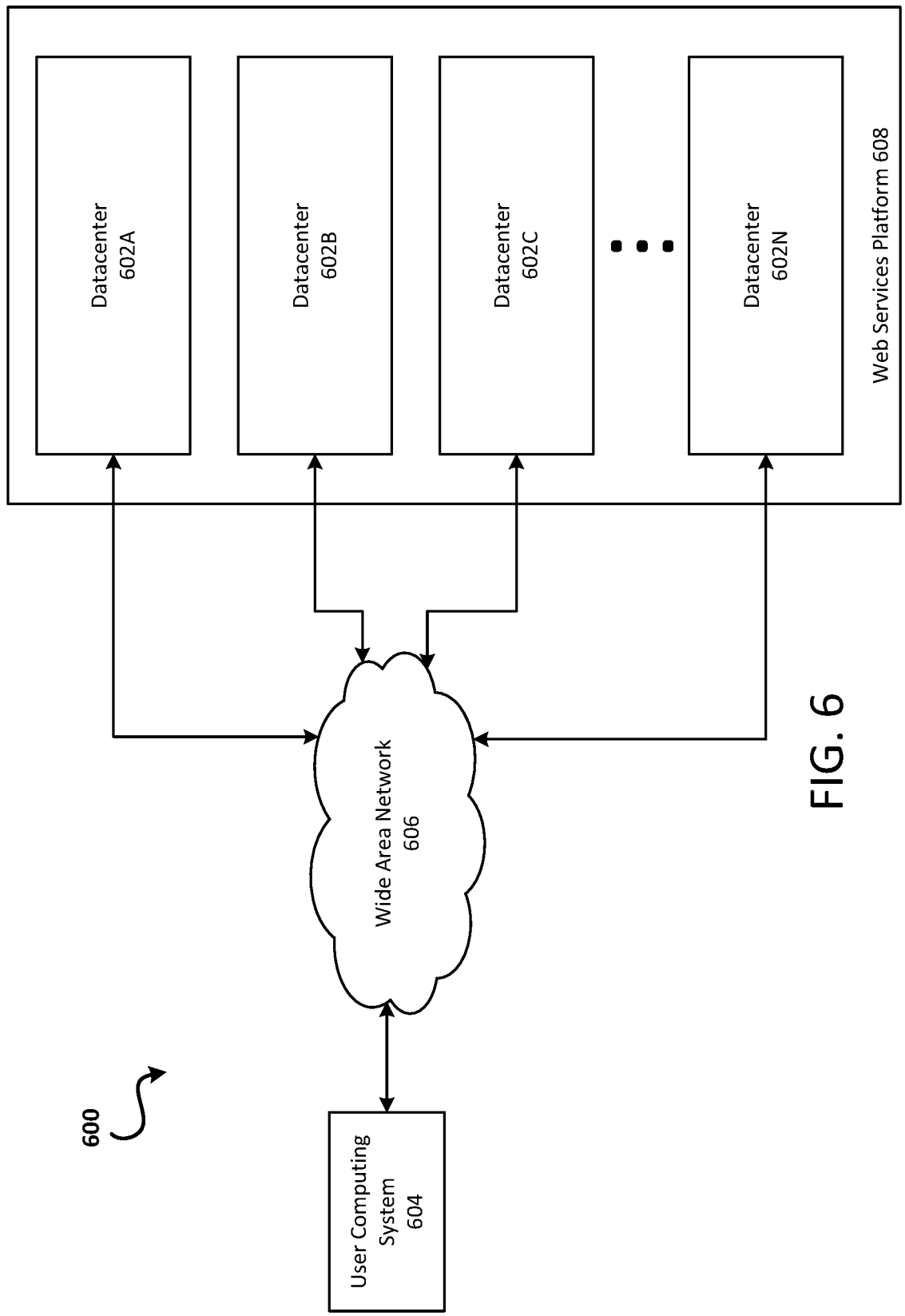
FIG. 6 depicts a web services platform, such as in FIG. 1, that comprises a plurality of datacenters.
Figure 7:
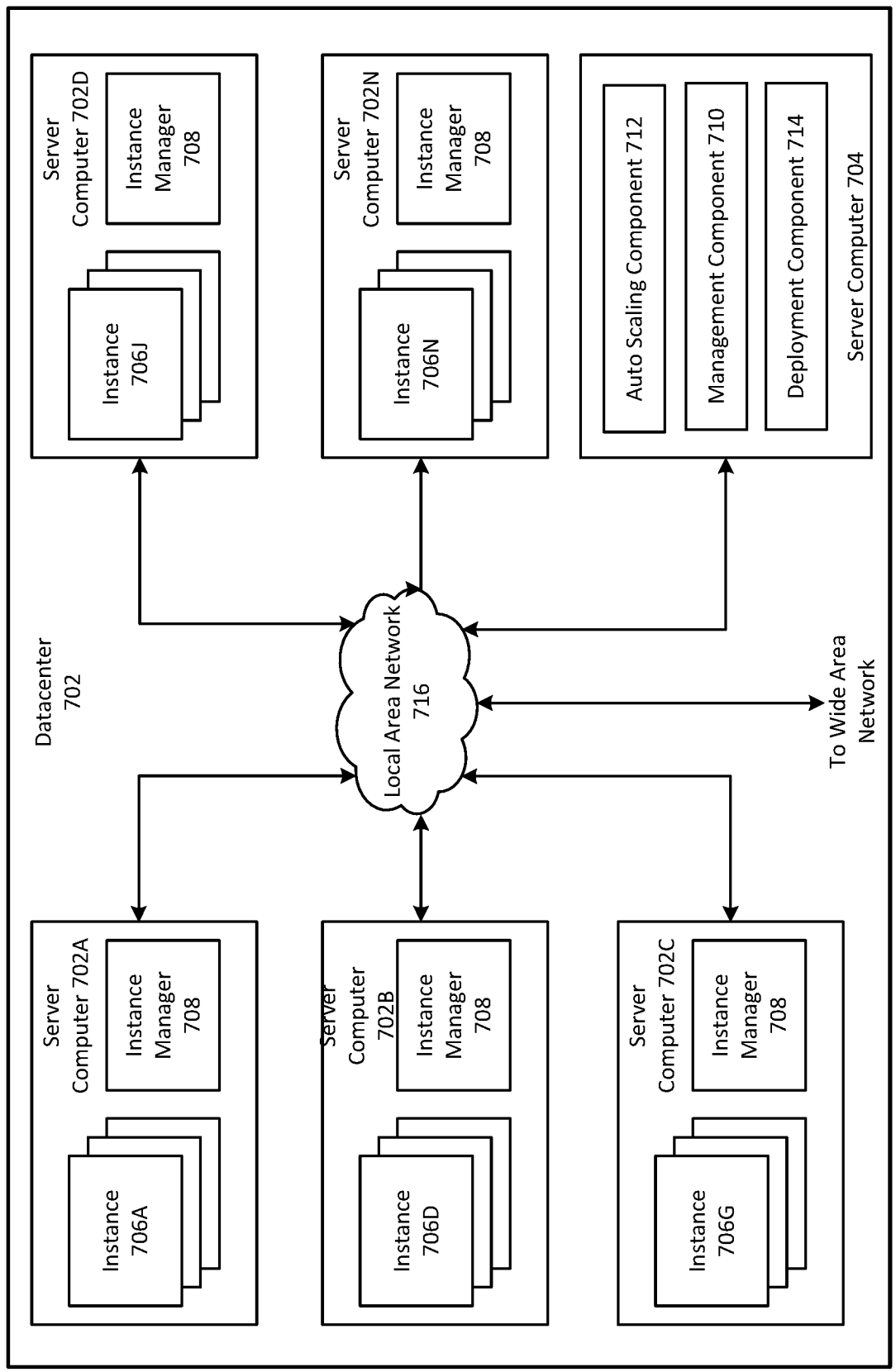
FIG. 7 depicts a datacenter, such as in FIG. 6, that comprises a plurality of computers.
Figure 8:
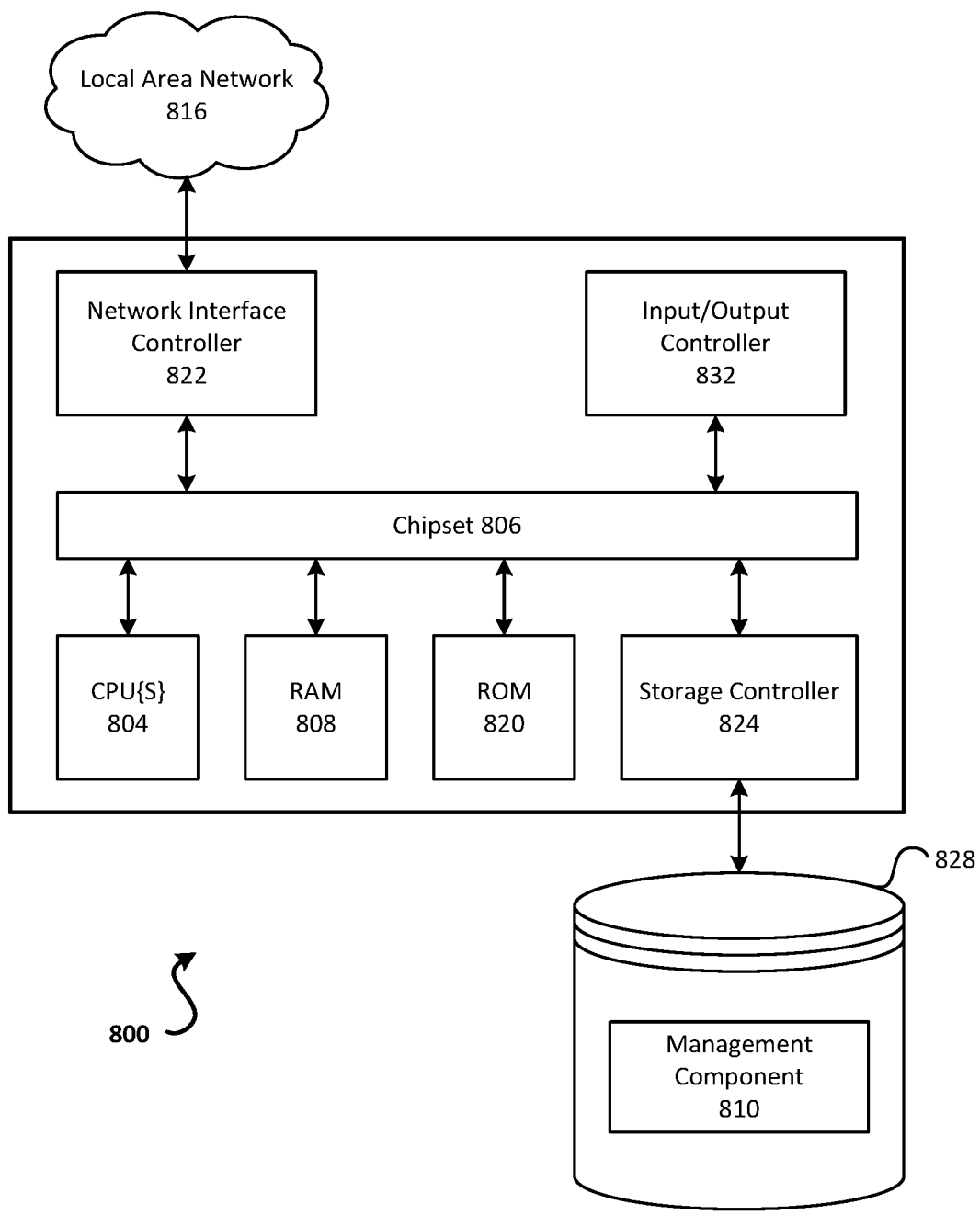
FIG. 8 depicts a computer that may be part of a datacenter, such as in FIG. 7.

FIGS. 6-8 are similar to FIG. 1 in that they depict example operating environments in which embodiments disclosed herein may be implemented, and said figures depict these operating environments at varying levels of granularity. FIG. 6 generally depicts a web services platform that comprises a plurality of datacenters. FIG. 7 generally depicts a datacenter that comprises a plurality of computers. FIG. 8 generally depicts a computer that may be part of a datacenter.

It may be appreciated that the operating environments of FIGS. 6-8 may be used to implement aspects of the operating environment of FIG. 1. For example, edge device 106 and host computer 110 may be implemented in a datacenter 602A of FIG. 6, or across multiple datacenters 602A, 602B, 602C, and/or 602N of FIG. 6. Likewise, computer 102A, 102B, and 102C may each be an instance of user computing system 604 of FIG. 6.

Turning now to details of FIG. 6, this figure depicts an example of a suitable computing environment in which embodiments described herein may be implemented. A cloud service provider (such as web services platform 608) may configure the illustrated computing environment to host virtual clouds of entities and to enable communication paths between these virtual clouds that may otherwise be isolated. In particular, FIG. 6 is a system and network diagram that shows an illustrative operating environment 600 that includes a web services platform 608 for implementing virtual clouds and for providing on-demand access to compute resources, such as virtual machine instances. Web services platform 608 can provide compute resources for executing applications on a permanent or an as-needed basis and may be configured as a private network. These compute resources may include various types of resources, such as data processing resources, data storage resources, data communication resources, and the like. Each type of compute resource may be general-purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of compute resource may be available in different sizes, such as large resources consisting of many processors, large amounts of memory, and/or large storage capacity, and small resources consisting of fewer processors, smaller amounts of memory, and/or smaller storage capacity. Entities may choose to allocate a number of small processing resources as web servers and/or one large processing resource as a database server, for example.

The compute resources provided by web services platform 608 may be enabled by one or more datacenters 602A-602N, which may be referred herein singularly as "datacenter 602" or in the plural as "datacenters 602." Datacenters 602 may be facilities that house and operate computer systems and associated components and may include redundant and backup power, communications, cooling, and security systems. Datacenters 602 may be located in a same geographical area, such as in a same facility, and may be interconnected using private networks, such as high-speed fiber optic networks, controlled and managed by a service provider of web services platform 608. Datacenters 602 may also be distributed across geographically disparate locations and may be interconnected in part using public networks, such as the Internet. One illustrative configuration for datacenter 602 that implements the concepts and technologies disclosed herein is described below with regard to FIG. 7.

Entities of web services platform 608 may access the compute resources provided by datacenters 602 over a Wide Area Network (WAN) 606. Although a WAN is illustrated in FIG. 6, it should be appreciated that a Local Area Network (LAN), the Internet, or any other networking topology known in the art that connects datacenters 602 to remote entities and other users may be utilized. It should also be appreciated that combinations of such networks may also be utilized.

An entity or other entities that are users of web services platform 608 may utilize a computing system 604 to access the compute resources provided by datacenters 602. User computing system 604 comprises a computer capable of accessing web services platform 608, such as a server computer, a desktop or laptop personal computer, a tablet computer, a wireless telephone, a PDA, an e-reader, a game console, a set-top box, or any other computing node.

As is described in greater detail below, user computing system 604 may be utilized to configure aspects of the compute resources provided by web services platform 608. In this regard, web services platform 608 may provide a web interface through which aspects of its operation may be configured through the use of a web browser application program executing on user computing system 604. Alternatively, a stand-alone application program executing on user computing system 604 may access an application programming interface (API) exposed by web services platform 608 for performing the configuration operations. Other mechanisms for configuring the operation of web services platform 608, including launching new virtual machine instances on web services platform 608, may also be utilized.

According to embodiments disclosed herein, capacities of purchased compute resources provided by web services platform 608 can be scaled in response to demand. In this regard, scaling refers to the process of instantiating, which may be referred to herein as "launching" or "creating," or terminating, which may also be referred to herein as "de-scaling," instances of compute resources in response to demand.

Web services platform 608 may also be configured with a deployment component to assist entities in the deployment of new instances of compute resources. The deployment component may receive a configuration from an entity that may include data describing how new instances should be configured. For example, the configuration may specify one or more applications or software components that should be installed in new instances, provide scripts and/or other types of code to be executed in new instances, provide cache warming logic specifying how an application cache should be prepared, and other types of information. The deployment component utilizes the entity-provided configuration and cache warming logic to launch, configure, and prime new instances of compute resources.

FIG. 7 depicts a computing system diagram that illustrates one configuration for datacenter 602 that implements web services platform 608. With regards to elements of the web services platform 150 previously described with respect to FIG. 1, host computer 110 may be a server computer 702 of FIG. 7 (which itself may be computer 800 of FIG. 8), host partition 112 may be an instance of instance manager 708 (where a host partition serves a hypervisor-type role), and VM instances 114A and 114B may each be an instance 706 of FIG. 7. Object level storage 118 and workload migration analyzer 116 of FIG. 1 may each be an instance of server computer 704 of FIG. 7.

The example datacenter 602 shown in FIG. 7 may include several server computers 702A-702N, which may be referred herein singularly as "server computer 702" or in the plural as "server computers 702," for providing compute resources for hosting virtual clouds and for executing applications. Server computers 702 may be standard tower or rack-mount server computers configured appropriately for providing the compute resources described above. For instance, in one implementation server computers 702 may be configured to provide instances 706A-706N of compute resources.

Instances 706A-706N, which may be referred herein singularly as "instance 706" or in the plural as "instances 706," may be virtual machine instances. As known in the art, a virtual machine instance is an instance of a software implementation of a machine (i.e., a computer) that executes programs like a physical machine. In the example of virtual machine instances, each server 702 may be configured to execute an instance manager 708 capable of executing the instances. Instance manager 708 may be a hypervisor or another type of program configured to enable the execution of multiple instances 706 on a single server 702, for example. As discussed above, each of instances 706 may be configured to execute all or a portion of an application.

It should be appreciated that although the embodiments disclosed herein are described primarily in the context of virtual machine instances, other types of instances can be utilized with the concepts and technologies disclosed herein. For instance, the technologies disclosed herein may be utilized with instances of storage resources, instances of data communications resources, and with other types of resources. The embodiments disclosed herein may also execute all or a portion of an application directly on a computer system without utilizing virtual machine instances.

Datacenter 602 shown in FIG. 7 may also include a server computer 704 reserved for executing software components for managing the operation of datacenter 602, server computers 702, and instances 706. In particular, server computer 704 may execute a management component 710. As discussed above, working between FIGS. 6 and 7, an entity of web services platform 608 may utilize user computing system 604 to access management component 710 to configure various aspects of the operation of web services platform 608 and instances 706 purchased by the entity. For example, the entity may purchase instances and make changes to the configuration of the instances. The entity may also specify settings regarding how the purchased instances are to be scaled in response to demand. The entity may also provide requests to launch instances to management component 710.

As also described briefly above, an auto scaling component 712 may scale instances 706 based upon rules defined by an entity of web services platform 608. For example, auto scaling component 712 may allow an entity to specify scale up rules for use in determining when new instances should be instantiated and scale down rules for use in determining when existing instances should be terminated.

As discussed briefly above, datacenter 602 may also be configured with a deployment component 714 to assist entities in the deployment of new instances 706 of compute resources. Deployment component 714 may receive a configuration from an entity that includes data describing how new instances 706 should be configured. For example, the configuration may specify one or more applications that should be installed in new instances 706, provide scripts and/or other types of code to be executed for configuring new instances 706, provide cache warming logic specifying how an application cache should be prepared, and other types of information.

Deployment component 714 may utilize the entity-provided configuration and cache warming logic to configure, prime, and launch new instances 706. The configuration, cache warming logic, and other information may be specified by an entity using management component 710 or by providing this information directly to deployment component 714. Other mechanisms may also be utilized to configure the operation of deployment component 714.

In the example datacenter 602 shown in FIG. 7, an appropriate LAN 716 may be utilized to interconnect server computers 702A-702N and server computer 704. LAN 716 may also be connected to WAN 606 illustrated in FIG. 6. It should be appreciated that the network topology illustrated in FIGS. 6 and 7 has been greatly simplified and that many more networks and networking devices may be utilized to interconnect the various computing systems disclosed herein. Appropriate load balancing devices or software modules may also be utilized for balancing a load between each of datacenters 602A-602N, between each of server computers 702A-702N in each datacenter 602 and between instances 706 purchased by each entity of web services platform 608. These network topologies and devices should be apparent to those skilled in the art.

It should be appreciated that datacenter 602 described in FIG. 7 is merely illustrative and that other implementations may be utilized. In particular, functionality described herein as being performed by management component 710, auto scaling component 712, and deployment component 714 may be performed by one another, may be performed by other components, or may be performed by a combination of these or other components. Additionally, it should be appreciated that this functionality may be implemented in software, hardware, or a combination of software and hardware. Other implementations should be apparent to those skilled in the art.

FIG. 8 depicts an example computer architecture for a computer 800 capable of executing the above-described software components. With regard to the example web services platform 150 described with respect to FIG. 1, host computer 110, as well as computers 102A, 102B, and 102C, may each be implemented in computer 800 of FIG. 8.

The computer architecture shown in FIG. 8 illustrates a conventional server computer, workstation, desktop computer, laptop, tablet, network appliance, PDA, e-reader, digital cellular phone, or other computing node, and may be utilized to execute any aspects of the software components presented herein described as executing within datacenters 602A-602N, on server computers 702A-702N, on the user computing system 604, or on any other computing system mentioned herein.

Computer 800 may include a baseboard, or "motherboard," which is a printed circuit board to which a multitude of components or devices may be connected by way of a system bus or other electrical communication paths. One or more central processing units (CPUs) 804 may operate in conjunction with a chipset 806. CPUs 804 may be standard programmable processors that perform arithmetic and logical operations necessary for the operation of computer 800.

CPUs 804 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

Chipset 806 may provide an interface between CPUs 804 and the remainder of the components and devices on the baseboard. Chipset 806 may provide an interface to a random access memory (RAM) 808 used as the main memory in computer 800. Chipset 806 may further provide an interface to a computer-readable storage medium, such as a read-only memory (ROM) 820 or non-volatile RAM (NVRAM) (not shown), for storing basic routines that may help to start up computer 800 and to transfer information between the various components and devices. ROM 820 or NVRAM may also store other software components necessary for the operation of computer 800 in accordance with the embodiments described herein.

Computer 800 may operate in a networked environment using logical connections to remote computing nodes and computer systems through LAN 816. Chipset 806 may include functionality for providing network connectivity through a network interface controller (NIC) 822, such as a gigabit Ethernet adapter. NIC 822 may be capable of connecting the computer 800 to other computing nodes over LAN 816. It should be appreciated that multiple NICs 822 may be present in computer 800, connecting the computer to other types of networks and remote computer systems.

Computer 800 may be connected to a mass storage device 828 that provides non-volatile storage for the computer. Mass storage device 828 may store system programs, application programs, other program modules, and data, which have been described in greater detail herein. Mass storage device 828 may be connected to computer 800 through a storage controller 824 connected to chipset 806. Mass storage device 828 may consist of one or more physical storage units. Storage controller 824 may interface with the physical storage units through a serial attached SCSI (SAS) interface, a serial advanced technology attachment (SATA) interface, a fiber channel (FC) interface, or other type of interface for physically connecting and transferring data between computers and physical storage units.

Computer 800 may store data on mass storage device 828 by transforming the physical state of the physical storage units to reflect the information being stored. The specific transformation of a physical state may depend on various factors and on different implementations of this description. Examples of such factors may include, but are not limited to, the technology used to implement the physical storage units and whether mass storage device 828 is characterized as primary or secondary storage and the like.

For example, computer 800 may store information to mass storage device 828 by issuing instructions through storage controller 824 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. Computer 800 may further read information from mass storage device 828 by detecting the physical states or characteristics of one or more particular locations within the physical storage units.

In addition to mass storage device 828 described above, computer 800 may have access to other computer-readable storage media to store and retrieve information, such as program modules, data structures, or other data. It should be appreciated by those skilled in the art that computer-readable storage media can be any available media that provides for the storage of non-transitory data and that may be accessed by computer 800.

By way of example and not limitation, computer-readable storage media may include volatile and non-volatile, transitory computer-readable storage media and non-transitory computer-readable storage media, removable and non-removable media implemented in any method or technology. Computer-readable storage media includes, but is not limited to, RAM, ROM, erasable programmable ROM (EPROM), electrically erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage, other magnetic storage devices, or any other medium that can be used to store the desired information in a non-transitory fashion.

Mass storage device 828 may store an operating system utilized to control the operation of the computer 800. According to one embodiment, the operating system comprises a version of the LINUX operating system. According to another embodiment, the operating system comprises a version of the WINDOWS SERVER operating system from the MICROSOFT Corporation. According to further embodiments, the operating system may comprise a version of the UNIX operating system. It should be appreciated that other operating systems may also be utilized. Mass storage device 828 may store other system or application programs and data utilized by computer 800, such as management component 810 and/or the other software components described above.

Mass storage device 828 or other computer-readable storage media may also be encoded with computer-executable instructions, which, when loaded into computer 800, transforms the computer from a general-purpose computing system into a special-purpose computer capable of implementing the embodiments described herein. These computer-executable instructions transform computer 800 by specifying how CPUs 804 transition between states, as described above. Computer 800 may have access to computer-readable storage media storing computer-executable instructions, which, when executed by computer 800, may perform operating procedures depicted in FIGS. 2-5.

Computer 800 may also include an input/output controller 832 for receiving and processing input from a number of input devices, such as a keyboard, a mouse, a touchpad, a touch screen, an electronic stylus, or other type of input device. Similarly, input/output controller 832 may provide output to a display, such as a computer monitor, a flat-panel display, a digital projector, a printer, a plotter, or other type of output device. It will be appreciated that computer 800 may not include all of the components shown in FIG. 8, may include other components that are not explicitly shown in FIG. 8, or may utilize an architecture completely different than that shown in FIG. 8.

As described herein, a computing node may be a physical computing node, such as computer 800 of FIG. 8. A computing node may also be a virtual computing node, such as a virtual machine instance, or a session hosted by a physical computing node, where the computing node is configured to host one or more sessions concurrently.

It should be appreciated that the network topologies illustrated in the figures have been greatly simplified and that many more networks and networking devices may be utilized to interconnect the various computing systems disclosed herein. These network topologies and devices should be apparent to those skilled in the art.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Each of the operations, processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method for migrating a computing application, comprising:
    identifying a plurality of workloads hosted on a plurality of computing nodes in a first network;
    generating a set of dependencies of a plurality of computing nodes in a first network representing at least one of the identified workloads;
    identifying at least a subset of the computing nodes based on the set of dependencies, wherein the identified computing nodes corresponds to a computer application operating on the first network;
    determining that a pattern of the identified computing node dependencies corresponding to the computer application corresponds to a pattern of relationships associated with an application available for execution on a web services platform; and
    migrating the computer application from the first network to the web services platform.

2. The method of claim 1, wherein the plurality of computing nodes in the first network form an on-premises network.

3. The method of claim 1, wherein migrating the computer application comprises migrating at least one computing node comprising a virtual machine to the web services platform.

4. The method of claim 3, comprising:
    identifying the pattern that corresponds to a computer application comprises determining a performance metric associated with the application on the web services platform.

5. The method of claim 1, comprising:
    gathering first data for a first computing node of the at least a subset of computing nodes by accessing the first data at a known computer storage location; and
    generating the dependencies based on the first data from the first computing node.

6. The method of claim 5, wherein the gathering first data for a first computing node comprises gathering the first data via an Application Programming Interface (API) call to the first computing node or a second computing node that has access to the first data.

7. The method of claim 1, wherein the computer application has execution divided among a plurality of computing nodes of the datacenter.

8. A system, comprising:
    a memory having stored thereon instructions that, upon execution by one or more processors, cause the system at least to:
    identify a plurality of workloads hosted on a plurality of computing nodes in a first network;
    generate a set of dependencies of a plurality of computing nodes in a first network representing at least one of the identified workloads;
    identify at least a subset of the computing nodes based on the set of dependencies, wherein the identified computing nodes corresponds to a computer application operating on the first network;
    determine that a pattern of the identified computing node dependencies corresponding to the computer application corresponds to a pattern of relationships associated with an application available for execution on a web services platform; and
    cause the computer application to be migrated from the first network to the application available for execution on the web services platform.

9. The system of claim 8, wherein the plurality of computing nodes in the first network form an on-premises network.

10. The system of claim 8, wherein the plurality of computing nodes comprises virtual machines.

11. The system of claim 10, wherein the memory further bears instructions that, upon execution by the processor, cause the system at least to:
    migrate at least one virtual machine to the web services platform.

12. The system of claim 8, wherein the memory further bears instructions that, upon execution by the processor, cause the system at least to:
    identify the pattern that corresponds to a computer application comprises determining a performance metric associated with the application on the web services platform.

13. The system of claim 8, wherein the instructions, upon execution by the processor, cause the system at least to gather first data for a first computing node of the first network by causing the system at least to:
    gather first data for a first computing node of the datacenter by accessing the first data at a known computer storage location; and
    generate the set of dependencies of at least part of the plurality of computing nodes based on first data from the first computing node.

14. The system of claim 13, wherein the instructions that, upon execution by the processor, cause the system at least to gather the first data for a first computing node of the first network further cause the system at least to:
    gather first data for the first computing node of the first network via an Application Programming Interface (API) call to the first computing node or a second computing node that has access to the first data.

15. The system of claim 8, wherein the computer application has execution divided among a plurality of computing nodes of the datacenter.

16. The system of claim 15, wherein the computer application comprises a three-tier computer application.

17. A system, comprising:
    one or more processors coupled to one or more memories having stored thereon instructions that, upon execution by the one or more processors, are operable to:
    identify a plurality of workloads hosted on a plurality of virtual machines in a first network;
    generate a set of dependencies of a plurality of virtual machines in a first network representing at least one of the identified workloads;
    identifying at least a subset of the virtual machines based on the set of dependencies, wherein the identified virtual machines corresponds to a computer application operating in an on-premises network;
    determine that a pattern of the identified virtual machines dependencies corresponding to the computer application corresponds to a pattern of relationships associated with an application available for execution on a web services platform; and
    migrate the computer application from the on-premises network to the application available for execution on the web services platform.

18. The system of claim 17, wherein the computer application comprises a three-tier computer application.

19. The system of claim 17, wherein the instructions that, upon execution by the one or more processors, are operable to gather the first data for a first virtual machine among the plurality of virtual machines of the on-premises network are further operable to:
- gather first data for a first virtual machine of the on-premises network via an Application Programming Interface (API) call to the first virtual machine or a second virtual machine that has access to the first data; and
- generate the set of relationships of at least part of the on-premises network based on first data from the first virtual machine.

20. The non-transitory computer-readable medium of claim 12, further bearing computer-executable instructions that, upon execution, are operable to perform operations comprising:
- determining that a first part of the computer application may be executed on the web services platform while a second part of the computer application continues to be executed in the on-premises network.

\* \* \* \* \*